(No Model.)
L. D. GODSHALL.
PROCESS OF EXTRACTING SILVER FROM ORES.
No. 547,881. Patented Oct. 15, 1895.
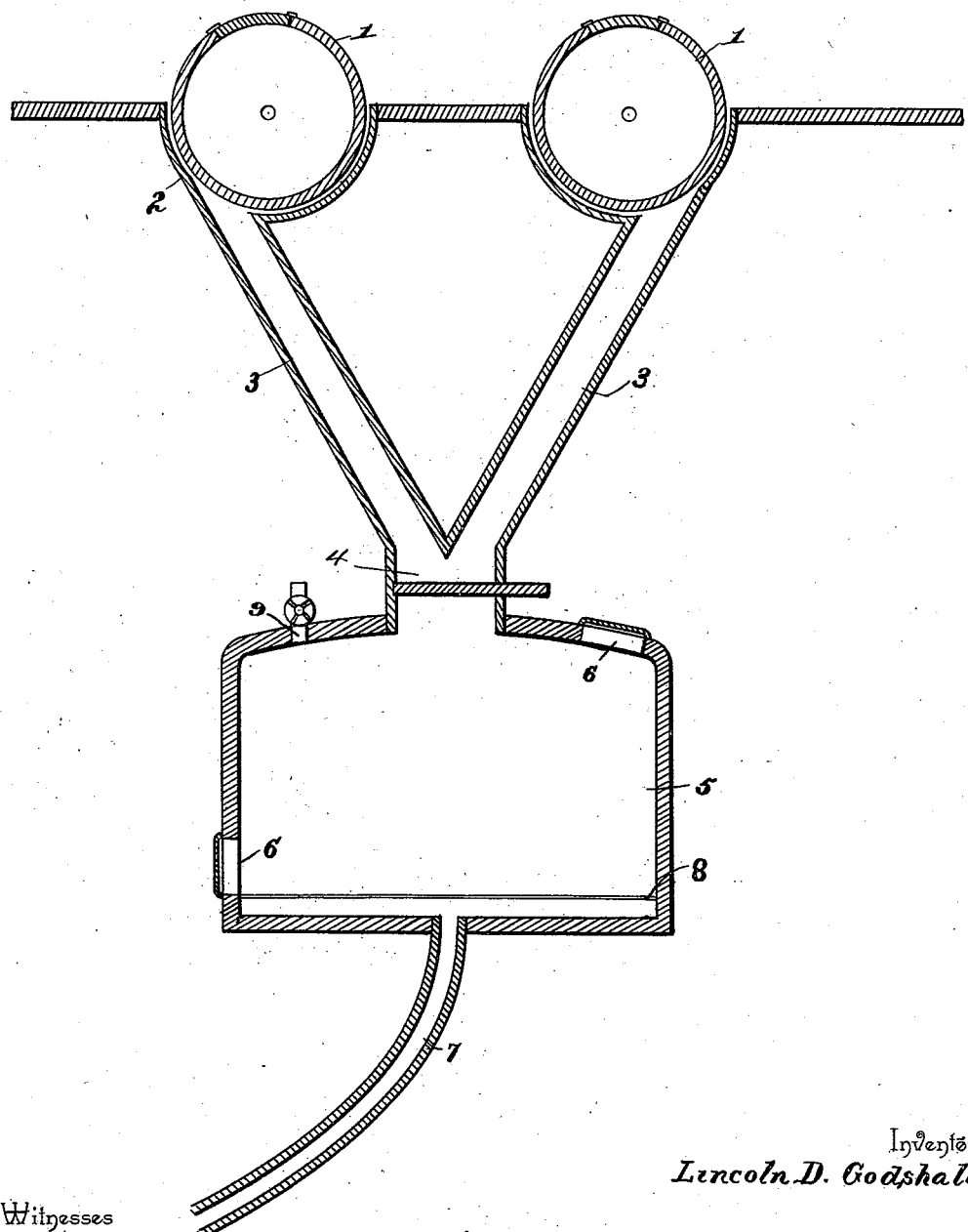
Witnesses
Inventor
Lincoln D. Godshall.
By his Attorneys,

UNITED STATES PATENT OFFICE.

LINCOLN D. GODSHALL, OF DENVER, COLORADO.

PROCESS OF EXTRACTING SILVER FROM ORES.

SPECIFICATION forming part of Letters Patent No. 547,881, dated October 15, 1895.

Application filed May 28, 1894. Serial No. 512,775. (No specimens.)

*To all whom it may concern:*

Be it known that I, LINCOLN D. GODSHALL, a citizen of the United States, residing at Denver, in the county of Arapahoe and State of Colorado, have invented a new and useful Process of Extracting Silver from Ores, of which the following is a specification.

This invention relates to processes for extracting silver from ores; and it has for its object to provide a new and useful process of this character which shall effect an economical extraction of silver from its ores.

To this end the main and primary object of the present invention is to provide a simple, practical, economical, and efficient method of extracting silver from ores by means of lixiviation, whereby the ordinary methods of leaching or lixiviating silver ores shall be greatly improved upon in point of time and the degree of extraction.

In order to properly understand the improvements contemplated by the present invention, attention is first directed to the ordinary processes of leaching or lixiviating silver ores as are now in common use. At present there are only two well-known methods for leaching or lixiviating, and they are by the use of a hyposulphite solution or by the use of sodium chloride, either alone or in conjunction with other chlorides, and in both of these methods or processes the ore, after being ground to a suitable degree of fineness, is first subjected to a chloridizing roasting to convert as much as possible of the silver into silver chloride. The ore after being chloridized in this manner is then charged into vats or open tubs, which are adapted to also receive the chemicals for dissolving the chloride.

It is a well-known fact that leaching in open tubs, as above described, is a very slow operation, frequently requiring three or four days to treat one charge when hyposulphites are employed, and when the ordinary "salt" or "chloride leaching" process is carried out the silver is still more slowly dissolved and thereby makes a great drawback to the economical extraction of the silver. In many cases the roasted ore contains compounds which greatly retard the extraction of the silver, by either precipitating the same in some form other than the chloride or reducing it to the metallic state, in either case rendering it very difficult and sometimes impossible to ultimately extract the silver. These compounds just referred to are frequently very slowly soluble and at the same time exert a very slow action on the silver chloride in solution, and therefore the long time required in ordinary tub-leaching gives these compounds opportunity to exert a deleterious action, whereas in the present invention the silver is dissolved and removed from the ore before these compounds are in solution, thereby saving both the time required in tub-leaching and avoiding the action of the deleterious compounds.

In the present invention the ore is first crushed to a suitable degree of fineness, ranging from a minimum of ten to a maximum of eighty meshes to the linear inch, according to its nature, and is then charged into a barrel or cask, preferably of wood, and of any desired capacity for holding from one to five tons of ore. The ore, which contains in the raw state a large percentage of chloride of silver or such compounds of silver as are easily converted into the chloride of silver by means of chemicals, is not subjected to a chloridizing roasting before being introduced into the barrel or cask referred to. After the introduction of the ore into the barrel or cask a strong solution of salt is added, together with a small percentage of a soluble salt of copper, preferably a sulphate or chloride. The whole mass is then heated to a degree near the boiling-point of water and the barrel closed and revolved or otherwise moved in order to thoroughly agitate the ore and solution therein. Under the influences of the solution, the heat, and the agitation many of the compounds of silver are rapidly chloridized and dissolved, and after the chloridizing action has ceased within the barrel or cask the agitation of the same is stopped and the entire contents, including the ore and solution, introduced into a pressure-tank, after which the barrel or cask may be filled again with a fresh charge.

The pressure-tank may be constructed of any size, shape, or capacity sufficient to hold the contents of the barrel or cask, and the same is adapted to contain a false bottom or other suitable outlet for the silver-bearing solution as the latter is forced out of the ore. This presure-tank, after the introduction of the ore and the solution therein, is adapted to be suitably closed up, so as to be both air and water tight, and the silver-bearing solution is then forced out of the ore and the tank by compressed air or by water under pressure. After the silver-bearing solution is separated from the ore in the manner just described the ore is thrown away and the silver recovered from the solution by any of the well-known methods now in use, but preferably by precipitation by metallic copper, the silver being obtained in this manner as comparatively pure bullion.

Many silver ores cannot be successfully treated in the above manner, inasmuch as they require a thorough chloridizing roasting to convert as much of the silver as possible into the chloride, but with the exception of the additional roasting the entire operation just described is carried out with such ores. Further, in cases where a hyposulphite leaching is preferred to salt or chloride leaching the ore, after a thorough chloridizing roasting, is charged into the barrel or cask either with water alone or with the regular hyposulphite solution.

Many advantages arise as the result of carrying out the improved process herein described, as it has been found that such a large volume of solution to dissolve the chloride of silver is not necessary as is employed when leaching from an open tub, it being well known that when leaching from an open tub it requires a volume of solution to dissolve the chloride of silver that is many times greater than the volume of the ore. It will therefore be seen that the herein-described process involves a great saving of time and a quick solution of the silver chloride, thus insuring the very high extraction and a very small volume of solution for treating the ore, which causes a great saving in chemicals.

The accompanying drawing shows a general sectional view of a form of apparatus that may be employed for the carrying out of the foregoing process. In the drawing 1 1 designate adjacently-arranged barrels or casks, that are preferably made of wood, and are of any desired capacity for holding from one to five tons of ore, as already described. These barrels or casks are adapted to be rotated in any suitable manner and accommodate therein the first charge of ore and chemicals. The barrels or casks are arranged to revolve partly within semicircular troughs 2, from which lead the discharge-pipes 3, which pipes merge into a valved inlet-neck 4, that leads into the top of a suitable pressure tank or vat 5. The pressure tank or vat 5 is provided with suitably-arranged manholes 6, and at the bottom with the bottom outlet-pipe 7 for the silver-bearing solution, and directly above the bottom of the tank or vat, within the same, is arranged the false bottom 8, on which is placed any suitable filtering material to provide for the filtration of the silver-bearing solution from the ore, which solution is forced out of the ore by means of air or water pressure admitted into the top of the tank or vat through the valved opening 9. This form of apparatus will provide for carrying out the process described; but the same forms no part of the present invention, as other forms of apparatus might be employed to advantage.

Having thus described the invention, what is claimed, and desired to be secured by Letters Patent, is—

The process of extracting silver from ores which consists in introducing the ore into a closed barrel or cask together with a solution of a leaching salt and a small percentage of a soluble metallic salt, heating and agitating the ore and solution within the barrel or cask, and subsequently removing the silver bearing solution from the waste ore or tailings by fluid pressure, substantially as set forth.

In testimony that I claim the foregoing as my own I have hereto affixed my signature in the presence of two witnesses.

LINCOLN D. GODSHALL.

Witnesses:
E. J. WILSON,
T. A. RICKARD.